3,600,415
FLUORINATED AMIDES
Richard F. Sweeney, Randolph Township, Morris County,
and Alson K. Price, Morristown, N.J., asssignors to
Allied Chemical Corporation, New York, N.Y.
No Drawing. Filed Aug. 1, 1968, Ser. No. 749,302
Int. Cl. C07d 103/38
U.S. Cl. 260—404.5                        18 Claims

ABSTRACT OF THE DISCLOSURE

Fluorinated amides useful as oil-repellency agents have the structural formula

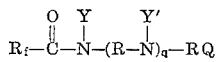

wherein $R_f$ is a fluorine-containing isoalkoxyalkyl group; Y is H or alkyl; R is a divalent alkylene bridging group; $q$ is an integer from 0 to 2; Q is a radical containing a tertiary amino group; and Y' is hydrogen, alkyl, hydroxyalkyl, an acyl radical $R_fCO$— wherein $R_f$ is as described above, or a radical of the formula —RNYZ wherein R and Y are as described above and Z is hydrogen, alkyl, or the above-described acyl radical.

BACKGROUND OF THE INVENTION

This invention relates to novel fluorocarbon derivatives. More particularly, this invention is concerned with fluorinated amide compounds containing a tertiary amino group, valuable as oil repellency agents.

Accordingly, it is an object of the present invention to provide fluorinated amide compounds containing a tertiary amino group having oil-repellency properties.

These and other objects are apparent from the following description.

SUMMARY OF THE INVENTION

The novel fluorinated amide compounds of the present invention have the structural formula:

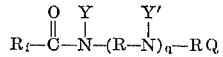    (I)

wherein (a) $R_f$ is a radical having the formula

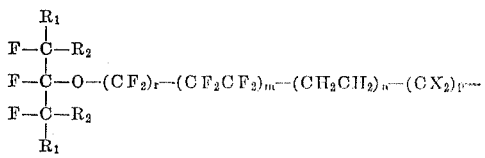

wherein (i) $R_1$ and $R_2$ are fluorine or are fluoroalkyl groups, or, when taken together, are fluoroalkylene groups forming a cycloaliphatic structure, which $R_1$ and $R_2$ groups may each have from 1 to 9 carbon atoms, provided that not more than three of the $R_1$ and $R_2$ groups may be fluoroalkyl groups, (ii) $m$ and $n$ are each integers of from 0 to 20, with the proviso that the sum of $m$ and $n$ is from 0 to 20, and provided further that when $r$ is 0, $m$ is at least 1, (iii) X is selected from the group consisting of hydrogen and fluorine, with the proviso that when $n$ is greater than 0, then X is always hydrogen, (iv) $p$ is 0 or 1, (v) $r$ is 0 or 1, with the proviso that when the sum of $m$, $n$ and $p$ is greater than 0, then $r$ is always 0, (b) Y is selected from the group consisting of hydrogen and alkyl having from 1 to 6 carbon atoms, (c) R, which may be the same or different, is a divalent straight-chain or branched-chain alkylene bridging group containing from 1 to 6 carbon atoms, (d) $q$ is an integer from 0 to 2, (e) Q is a member selected from the group consisting of (i) the pyridyl radical, (ii) alkyl-substituted pyridyl radicals wherein the alkyl substituent or substituents contain from 1 to 2 carbon atoms, and (iii) a radical having the formula

wherein $R^a$ and $R^b$ are independently selected from the group consisting of alkyl having from 1 to 6 carbon atoms and a radical having the formula —ROH wherein R has the afore-stated meaning, (f) Y' which may be the same or different in different

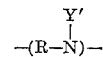

groups, is a member selected from the group consisting of (i) hydrogen, (ii) alkyl having from 1 to 6 carbon atoms, (iii) a radical having the formula —ROH wherein R has the afore-stated meaning, (iv) an acyl radical having the formula

wherein $R_f$ has the afore-stated meaning, (v) a radical having the formula —RNYZ wherein R and Y have the afore-stated meanings and Z is a member selected from the group consisting of hydrogen, alkyl having from 1 to 6 carbon atoms, and an acyl radical having the formula

wherein $R_f$ has the afore-stated meaning, wherein $R^a$ and $R^b$, and $R^a$ and Y', when taken together, may be alkylene groups forming a cycloaliphatic structure.

The novel fluorocarbon derivatives of the present invention may be prepared by reacting a polyamine compound corresponding to the general formula

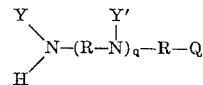    (II)

wherein Y, R, $q$, Y' and Q have the afore-stated meanings with a fluorinated carboxylic acid reactant having a fluorine-containing isoalkoxyalkyl group. The fluorinated carboxylic acid reactant comprises acids having the formula

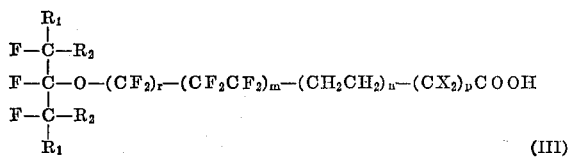

(III)

wherein $R_1$, $R_2$, X, m, n, p and r have the afore-stated meanings, and their lower alkyl esters.

The polyamine starting materials of Formula II, above, employed in the preparation of the novel fluorocarbon derivatives of the present invention, as a class, are known compounds. These polyamine starting materials may be straight chain or branched chain compounds and may be used in the form of a single compound, as a mixture of isomers or as a mixture of polyamines containing from 2 to 4 nitrogen atoms in the molecule. The polyamine starting materials may be prepared using standard procedures known to those skilled in the art. A number of these compounds, such as for example, 3-(N,N-dimethylamino)propylamine, 2 - (N,N-dimethylamino)ethylamine, 2-aminoethyl-6-methylpyridine, 3-aminomethyl-6-methylpyridine, N-($\gamma$-aminopropyl) - N' - methylpiperazine, 2-amino-5-diethylaminopentane, 3-(N,N-di-n-butylamino)-propylamine, N,N-di-ethylethylenediamine, 3-(4-methylaminobutyl)-pyridine, 2 - ($\beta$-methylaminoethyl)-pyridine, and N,N,N' - triethylethylethylenediamine, are commercially available.

Fluorinated carboxylic acids of Formula III, above wherein r is 0, m is at least 1, and the sum of n and p is at least 1, can be prepared by various herinafter described methods from telomers having the general formula

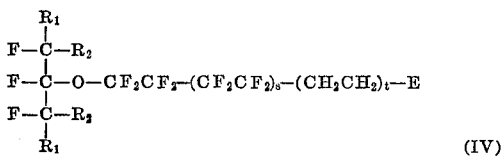

(IV)

wherein $R_1$ and $R_2$ have the afore-stated meanings, wherein s and t are each integers from 0 to 20, the sum of s and t being at least 1, and wherein E is a halogen selected from the group consisting of bromine and iodine. Telomers of that type and their preparation are described in detail in commonly assigned copending application of Anello et al. entitled, "Telomers and Process for the Preparation Thereof," Ser. No. 633,359, filed Apr. 25, 1967, the pertinent subject matter of which is hereby incorporated by reference. By way of general description, these telomers are prepared by radical addition reactions of polyfluoroisoalkoxyalkyl halide telogens of the formula

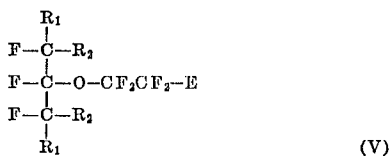

(V)

wherein $R_1$, $R_2$ and E have the afore-stated meanings, with telomerizable unsaturated compounds. The telomerization reaction may be initiated by heat or by means of a free radical initiating catalyst. The polyfluoroisoalkoxyalkyl halide telogen starting materials may be prepared by reacting a corresponding halogenated ketone with an ionizable fluoride salt, e.g. CsF, to form a fluorinated organic salt and then reacting the organic salt with a halogen other than fluorine or chlorine and tetrafluoroethylene. Preparation of the telogen starting materials is described in detail in copending applications of Litt et al., "Fluorinated Ethers," U.S. Ser. Nos. 492,276 and 513,574, filed Oct. 1, 1965, and Dec. 13, 1965 respectively, the pertinent subject matter of which applications is hereby incorporated by reference.

Fluorinated carboxylic acids of Formula III, above, wherein r, n and p are all 0 and wherein m is at least 2 may be prepared by reacting the corresponding telomer represented by general Formula IV above wherein t is 0 with ICN or $(CN)_2$ to form the nitrile, followed by hydrolysis of the nitrile in known manner to form the free acid. The reaction between the telomer and the ICN or $(CN)_2$ to form the nitrile is carried out under superatmospheric pressure above about 20 to 200 atmospheres or more at temperatures in excess of about 300° C., preferably using an excess of the ICN or $(CN)_2$ reactant. Hydrolysis of the nitrile to form the free acid can be effected by treatment with aqueous mineral acid, such as hydrochloric, phosphoric or sulfuric acid, at temperatures between about 60° and about 125° C.

Fluorinated carboxylic acids of Formula III, above, wherein m is at least 1, p and r are both 0 and n is greater than 0 may be prepared by reacting the corresponding telomer represented by Formula II, above, wherein t is greater than 0 with an alkali metal cyanide to form the nitrile, followed by hydrolysis of the nitrile to form the free acid, as described above. The reaction between the telomer and the alkali metal cyanide is preferably carried out in aqueous alcoholic solution at temperatures between about 60° and about 100° C.

Fluorinated carboxylic acids of Formula III, above, wherein m is at least 1, r is 0, p is 1 and X is hydrogen can be prepared by reacting the corresponding telomer represented by general Formula IV, above, wherein t is at least 1 with $SO_3$ to form the corresponding pyrosulfate, or with oleum to form the corresponding hydrosulfate, hydrolysis of the pyrosulfate or the hydrosulfate with aqueous acid to form the corresponding alcohol, followed by oxidation of the alcohol with dichromate, permanganate or strong nitric acid to form the free acid.

Florinated carboxylic acid of Formula III, above, wherein m is at least 1, r and n are both 0, p is 1 and X is fluorine can be prepared by reacting a corresponding telomer represented by Formula IV, above, wherein t is 0 with $SO_3$ to form corresponding acid halides and fluoropyrosulfates and hydrolyzing the acid halides and fluoropyrosulfates by refluxing with water to obtain the corresponding free acids. Fluorinated carboxylic acids of Formula III, above, wherein r is 1 and m, n and p are all 0 can be prepared from polyfluoroisoalkoxyalkyl halide compounds of Formula V, above, by reacting them with a Grignard reagent to form a magnesium halide adduct, reacting this adduct with $CO_2$ to form a magnesium halide salt, and then acidifying this salt to obtain the desired acid. The reactions involving the Grignard reagent and the carbon dioxide proceed very rapidly and can be conducted at temperatures considerably below 0° C. Preparation of these acids is described in detail in commonly assigned copending application of Litt et al., "Fluorinated Ethers," U.S. Ser. No. 492,276, filed Oct. 1, 1965, referred to above.

The lower alkyl esters of the above-described acids may be prepared from the acids by conventional procedures.

While the telomers of Formula IV, above, and the fluorinated carboxylic acid reactants derived therefrom, may be prepared as discrete compounds, they are generally obtained as mixtures of compounds of varying chain length. It is to be understood that both, the individual discrete fluorinated carboxylic acid reactants as well as their mixtures of compounds of varying chain length are suitable for the preparation of the novel fluorinated compounds of the present invention. It is therefore intended that the appended claims cover fluorinated amide compositions derived from individual, discrete fluorinated carboxylic acid reactants as well as fluorinated amide compositions derived from mixtures of carboxylic acid reactants of varying chain length.

Preparation of the above-described acids is described in more detail in commonly assigned copending applications of Anello et al., U.S. Ser. Nos. 721,115 and 721,117, both filed Apr. 12, 1968, respectively entitled, "Fluorocarbon Acids and Derivatives" and "Fluorocarbon Compounds," the pertinent subject matter of which applications is hereby incorporated by reference.

The fluorinated amide compounds of the present invention may be prepared by simply mixing the fluorinated carboxylic acid reactant with the amine starting material. These reactants may be charged in a molar proportion of 1 mol of amine starting material to about 1 to 10, preferably about 1 to 3 mols of florinted carboxylic acid reactant. Use of the reactants in about stoichiometrically required amount is especially desirable.

The reaction temperature, in general, is dependent upon the particular fluorinated carboxylic acid reactant and amine reactant involved. The temperature may range from about 0° to 200° C. although temperatures above about 100° C. are normally used when the fluorinated carboxylic acid reactant comprises a fluorinated carboxylic acid and temperatures below about 100° C. are preferred when an ester serves as the fluorinated carboxylic acid reactant. If desired, the reaction may be conducted in the presence of an inert organic solvent, and, when present, the maximum temperature employable is limited only by the reflux temperature of the mixture. Although the reaction may be effected at superatmospheric pressure, the reaction is preferably conducted at atmospheric pressure.

The inert organic solvent employable herein is generally one lower boiling than the fluorinated amide product and may be lower boiling or higher boiling than the by-product materials formed during the reaction. Any organic liquid which is capable of solubilizing the amine reactant and inert to the reactants and products of the reaction may be employed. Suitable inert organic solvents include ethers such as dioxane, diethyl ether, diisopropyl ether, di-n-propyl ether and tetrahydrofuran; hydrocarbons such as heptane, benzene, toluene and xylene; dimethylformamide; tetramethylenesulfone or any other customarily employed organic solvent.

When the fluorinated carboxylic acid reactant is present in the form of a lower alkyl ester of one of the above-described fluorinated carboxylic acids, as preferred, an alcohol is obtained as by-product of the reaction. The alcohol may readily be removed by conducting the reaction at about the reflux temperature of the mixture, and the desired fluorinated amide product recovered as the distilland.

When one of the above-described fluorinated carboxylic acids serves as the fluorinated carboxylic acid reactant, water is formed as by-product of the reaction and may be readily removed by conducting the reaction at temperatures above the boiling point of the by-product water. If desired, the preparation of the fluorinated amide product may be facilitated by employment of azeotropic materials which aid in the removal of water should the reaction be effected at temperatures below the boiling point of the by-product water. Readily available organic substances capable of forming an azeotrope with water include xylene, toluene, benzene and tetralin.

The reaction product, obtained as a result of the reaction of the fluorinated carboxylic acid reactant and the amine reactant above described, may comprise a single compound conforming to the above stated structural Formula I, a mixture of isomers thereof or a reaction mass composed of amide products containing one or more amide functions depending upon the amine reactant employed, the reactivity of the fluorinated carboxylic acid reactant present, the solubility of the amide product obtained during the reaction in the reaction mixture and the molar proportions of fluorinated carboxylic acid reactant employed. The resulting fluorinated amide product, whether it comprises a single compound, a mixture of isomers thereof or a mass composed of amide products containing one or more amide functions, is suitable without further purification for direct application as an oil-repellency agent. However, if desired, the fluorinated amide product may be further purified as by distillation or recrystallization from any commonly employed inert organic solvent such as acetonitrile, chloroform, ethanol and propanol.

DESCRIPTION OF THE PREFERRED EMBODIMENTS

In the

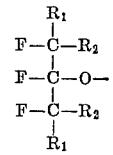

moiety of the $R_f$ radical of the fluorinated amide compounds of Formula I, above, $R_1$ and $R_2$ are preferably fluorine or perfluoroalkyl groups. When perfluoroalkyl groups, $R_1$ and $R_2$ preferably contain 1–2 carbon atoms. When the $R_1$ and $R_2$ groups contain hydrogen substitution, the atomic ratio of fluorine to hydrogen is at least 1:1.

In preferred embodiments integer $m$ in the $R_f$ radical of the fluorinated amide compounds of Formula I, above, is at least 1, and the sum of $m$ and $n$ is preferably from 1 to 10. Specific examples of preferred embodiments of the preferred

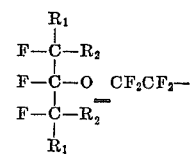

moiety of the $R_f$ radical of the compounds of the present invention include the following:

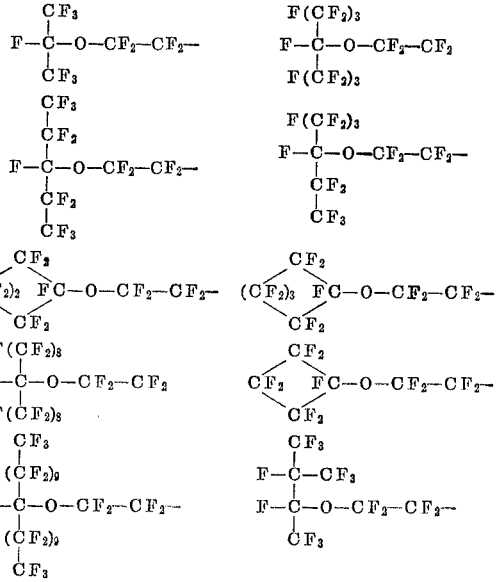

$R_f$ radicals having the structural formula

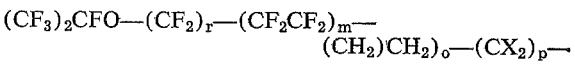

wherein X, $r$ and $p$ have the afore-stated meanings and wherein $m$ and $n$ are each integers of from 0 to 10, with the proviso that the sum of $m$ and $n$ is from 0 to 10, constitute a particularly preferred embodiment of that radical.

In preferred embodiments of the compounds of the present invention represented by Formula I, above, the divalent alkylene bridging group R contains from 2 to 4 carbon atoms and Y is H.

Most preferred embodiments of the present invention are compounds having the structural formula

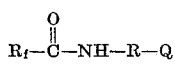

wherein $R_f$, R and Q have the afore-stated meanings, and specifically those wherein Q is a radical having the formula

wherein $R^a$ and $R^b$, which may be the same or different, are alkyl radicals having from 1 to 3 carbon atoms.

The following examples relate to the production of representative compounds of the present invention but are not intended to be limiting on the scope thereof.

EXAMPLE 1

Methyl perfluoro(7-oxa-8-methylnonanoate) (15.0 g., 0.032 mol) was dissolved in 13.5 g. of ethyl ether and this solution was cooled in an ice bath to a temperature of 0°–5° C. To this solution was added 3.26 g. (0.032 mol) of 3-(N,N-dimethylamino)propylamine dropwise under constant stirring and while maintaining the temperature of the reaction mixture at between 0°–5° C. The reaction mixture was then allowed to warm to room temperature (about 25° C.) and was allowed to stand at that temperature for a period of 17 hours. After that 17 hour period a portion of the reaction mixture was subjected to infrared analysis. The presence of strong amide bands at 5.84μ and 6.55μ and the absence of a band corresponding to an ester function indicated completion of the reaction. The reaction mixture was then transferred to distillation apparatus suitable for distillation under reduced pressure. After the more volatile ether had been distilled off the apparatus was evacuated and the sought-for amide product having the formula

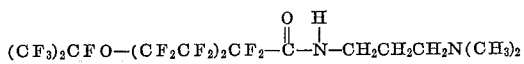

B.P. 91°–93° C./0.4 mm. Hg was recovered as distillate.

Elemental analysis of the product compared with calculated values for $C_{14}H_{13}N_2O_2F_7$ as follows:

Calculated (percent): C, 29.8; H, 2.3; N, 4.96; F, 57.3. Found (percent): C, 30.3; H, 2.4; N, 4.8; F, 60.3.

The assigned structure was confirmed by infrared analysis.

EXAMPLE 2

Following the procedure of Example 1 there were reacted 125.8 g. (0.43 mol) methylperfluoro(3-oxa-4-methylpentanoate) with 43.7 g. (.427 mol) of 3-(N,N-dimethylamino)propylamine in 108.3 g. of ethyl ether to obtain as product the compound $$(CF_3)_2CFO-CF_2-\overset{O}{\underset{\|}{C}}-\overset{H}{\underset{|}{N}}-CH_2CH_2CH_2N(CH_3)_2$$

B.P. 101.5°–103.5° C./10 mm. Hg.

Elemental analysis of the product compared with calculated values for $C_{10}H_{13}N_2O_2F_9$ as follows:

Calculated (percent): C, 33.0; H, 3.58; N, 7.7; F, 47.0. Found (percent): C, 32.95; H, 3.49; N, 7.28; F, 48.3.

The assigned structure was confirmed by infrared analysis.

EXAMPLE 3

Following the procedure set forth in Example 1 there were reacted 80 g. (0.203 mol) of methylperfluoro(5-oxa-6-methylheptanoate) with 20.7 g. (0.203 mol) of 3-(N,N-dimethylamino)propylamine in 100 ml. of ethyl ether to obtain as product the compound

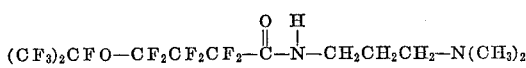

B.P. 108°–109° C./5 mm. Hg.

Elemental analysis of the product compared with calculated values for $C_{12}H_{13}N_2O_2$ as follows:

Calculated (percent): C, 31.0; H, 2.8; N, 6.0; F, 53.2. Found (percent): C, 32.2; H, 2.9; N, 6.2; F, 50.9.

The assigned structure was confirmed by infrared analysis.

EXAMPLE 4

Following the procedure of Example 1 there were reacted 15 g. (0.025 mol) of methylperfluoro(9-oxa-10-methylundeconoate) with 2.57 g. (0.25 mol) of 3-(N,N-dimethylamino)propylamine in 13 g. of ethyl ether to obtain 14.6 g. (88% yield) of the compound

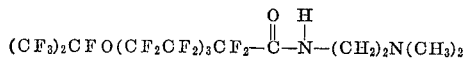

This compound has a boiling point of 113°–113.5° C. at 2 mm. Hg.

Elemental analysis of that product, after purification by fractional distillation, compared with calculated values for $C_{16}H_{13}N_2O_2F_{21}$ as follows:

Calculated (percent): C, 28.9; H, 1.96; F, 60.1. Found (percent): C, 29.18; H, 2.17; F, 60.8.

The assigned structure was confirmed by infrared analysis.

EXAMPLE 5

Over a period of 10 minutes, 6.51 g. (0.048 mol) of 2-(β-methylaminoethyl)pyridine was added to 25 g. (0.048 mol) of $(CF_3)_2CFO-(CF_2)_5-COOC_3H_7$ at a temperature of 40° C. This mixture was heated to 75° C. at which temperature it was maintained for 80 minutes, following which it was subjected to fractional distillation to obtain as distillate 17.7 g. of the pure compound having the structural formula

B.P. 110–111° C./0.2 mm. Hg, M.P. 28.5°–30° C. Assigned structure was confirmed by infrared analysis.

EXAMPLE 6

7.68 g. (0.059 mol) of 3-(N,N-diethylamino)propyl amine was added dropwise to 25 g. (0.059 mol) of $(CF_3)_2CFO-(CF_2)_3-COOC_3H_7$ at 40° C. The reaction mixture was then maintained for 3 hours at 40° C. and was then subjected to fractional distillation to obtain as distillate 23.6 g. of the product $$(CF_3)_2CFO-(CF_2)_3-CONH-(CH_2)_3N(C_2H_5)_2$$

B.P. 102–105° C./0.8 mm. Hg. Assigned structure was confirmed by infrared analysis.

EXAMPLE 7

Following the procedure set forth in Example 6, 22 g. (0.048 mol) of 3-(N,N-diethylamino)propyl amine was reacted with 25 g. (0.048 mol) of the ester $$(CF_3)_2CFO-(CF_2)_5COOC_3H_7$$

to obtain as product the compound $$(CF_3)_2CFO-(CF_2)_5-CONH-(CH_2)_3N(C_2H_5)_2$$

B.P. about 110° C./1 mm. Hg.

EXAMPLES 8–38

Additional illustrative fluorinated amide reaction products of the present invention having oil-repellency properties are listed in the Table I below. These products are made by reacting fluorinated carboxylic acid and amine reactants in manner analogous to that described in the above examples.

TABLE I

| Example | Fluorinated carboxylic acid reactant | Amine reactant | Product |
|---|---|---|---|
| 8 | $(CF_3)_2CFO-CF_2CF_2-CH_2CH_2-COOH$ | $NH-C_2H_4-N(CH_3)(C_3H_7)$ | $(CF_3)_2CFO-CF_2CF_2-CH_2CH_2-CONHC_2H_4N(CH_3)(C_3H_7)$ |
| 9 | $(CF_3)_2CFO-(CF_2)_4-(CH_2)_5COOH$ | $NH(CH_3)-C_4H_8N-N(C_4H_{10})_2$ | $(CF_3)_2CFO-(CF_2)_4-(CH_2)_5-CON(CH_3)-C_4H_8N-N(C_4H_{10})_2$ |
| 10 | $(CF_3)_2CFO-(CF_2)_2-CH_2-COOC_2H_5$ | $NH_2-C_6H_{12}-N(CH_3)_2$ | $(CF_3)_2CFO-(CF_2)_2-CH_2-CONH-C_6H_{12}N(CH_3)_2$ |
| 11 | $(CF_3)_2CFO-(CF_2)_{10}-(CH_2)_{11}COOCH_3$ | $NH_2-(C_3H_6NH)_2C_3H_6N-C_2H_4N(CH_3)_2$ | $(CF_3)_2CFO-(CF_2)_{10}-(CH_2)_{11}CONH-(C_3H_6NH)_2-C_3H_6N(CH_3)_2$ |
| 12 | $\begin{array}{c}CF_2\\CF_2\quad CFO-(CF_2)_2-(CH_2)_2COOCH_3\\CF_2\end{array}$ | $NH_2-C_3H_6NH-C_3H_6NCH_3)_2$ | $\begin{array}{c}CF_2\\CF_2\quad CFO-(CF_2)_2-(CH_2)_2-CONH-C_3H_6NH-C_3H_6N(CH_3)_2\\CF_2\end{array}$ |
| 13 | $(CF_3)_2CFO-CF_2CF_2-CH_2CH_2-COOH$ | $NH_2-C_2H_4NH-C_2H_4N(C_2H_5)_2$ | $(CF_3)_2CFO-CF_2CF_2-CH_2CH_2-CONH-C_2H_4N-C_2H_4N(C_2H_5)_2$ |
| 14 | $\begin{array}{c}(CF_2)_2F\\F-C-O-CF_2CF_2-COOH\\(CF_2)_2F\end{array}$ | $NH(CH_3)-(C_2H_4NH)_2-C_2H_4N(CH_3)_2$ | $\begin{array}{c}(CF_2)_2F\\F-C-O-CF_2CF_2-CON(CH_3)(C_2H_4NH)_2-C_2H_4N(CH_3)_2\\(CF_2)_2F\end{array}$ |
| 15 | $(CF_3)_2CFO-(CF_2)_4-(CH_2)_2COOCH_3$ | $NH_2-C_4H_8N(C_6H_{13})-C_4H_8N(CH_3)_2$ | $(CF_3)_2CFO-(CF_2)_4-(CH_2)_2CONH-C_4H_8N(C_6H_{13})-C_4H_8N(CH_3)_2$ |
| 16 | $\begin{array}{c}(CF_2)_3F\\F-C-O-(CF_2)_{20}(CH_2)_{21}COOCH_3\\CF_3\end{array}$ | $NH_2-C_2H_6N(CH_3)_2$ | $\begin{array}{c}(CF_2)_3F\\F-C-O-(CF_2)_{20}-(CH_2)_{21}CONHC_2H_6N(CH_3)_2\\CF_3\end{array}$ |
| 17 | $(CF_3)_2CFO-(CF_2)_3COOCH_3$ | $NH(CH_3)-[C_4H_8N(CH_3)]_2C_4H_8N(CH_3)_2$ | $(CF_3)_2CFO-(CF_2)_3CON(CH_3)-[C_4H_8N(CH_3)]_2C_4H_8N(CH_3)_2$ |
| 18 | $(CF_3)(C_2F_5)CFO-(CF_2)_2(CH_2)_3COOCH_3$ | $NH(CH_3)C_2H_4NH)_2C_2H_4N(CH_3)_2$ | $(CF_3)(C_2F_5)CFO-(CF_2)_2(CH_2)_3-CON(CH_3)(C_2H_4NH)_2C_2H_4N(CH_3)_2$ |
| 19 | $(CF_3)_2CFO-(CF_2)_2-(CH_2)_2COOH$ | $\begin{array}{c}C_2H_4NH_2\\\|\\NH_2C_2H_4N(CH_3)C_2H_4N-C_2H_4N(CH_3)_2\end{array}$ | $\begin{array}{c}O=C-(CH_2)_2-(CF_2)_2-OCF(CF_3)_2\\\|\\(CF_3)_2CFO-(CF_2)_2-(CH_2)_2CONHC_2H_4N(CH_3)C_2H_4N(CH_3)_2\end{array}$ |
| 20 | $(CF_3)_2CFO-(CF_2)_{20}-COOCH_3$ | $\begin{array}{c}C_2H_4N(CH_3)_2\\\|\\NH_2C_2H_4N-C_2H_4N(CH_3)_2\end{array}$ | $\begin{array}{c}C_2H_4NH(C_6H_{13})\\\|\\(CF_3)_2CFO-(CF_2)_{20}-CONHC_2H_4NC_2H_4N(CH_3)_2\end{array}$ |
| 21 | $(CF_3)_2CFO-(CF_2)_2(CH_2)_2COOC_2H_5$ | $\begin{array}{c}C_6H_{12}NH(C_6H_{13})\\\|\\NH_2C_6H_{12}-N-C_4H_{12}N(C_4H_9)_2\end{array}$ | $\begin{array}{c}C_4H_{12}NH(C_6H_{13})\\\|\\(CF_3)_2CFO-(CF_2)_2(CH_2)_2CONHC_4H_{12}-N-C_4H_{12}N(C_4H_9)_2\end{array}$ |
| 22 | $(CF_3)_2CFO-(CF_2)_5COOH$ | $NH_2-CH_2-\underset{N}{\underset{\|}{\bigcirc}}-CH_3$ | $(CF_3)_2CFO-(CF_2)_5CONHCH_2-\underset{N}{\underset{\|}{\bigcirc}}-CH_3$ |

TABLE I—Continued

| Example | Fluorinated carboxylic acid reactant | Amine reactant | Product |
|---|---|---|---|
| 23 | Same as above | NH(C₄H₉)C₂H₄N(C₂H₅OH)₂ | (CF₃)₂CFO—(CF₂)₅CON(C₄H₉)C₂H₄N(C₂H₅OH)₂ |
| 24 | (CF₃)₂CFO—(CF₂)₅COOCH₃ | NH₂C₂H₄NHC₃H₆N(CH₃)C₄H₈N(CH₃)(CH₂OH) | (CF₃)₂CFO—(CF₂)₅CONHC₂H₄NHC₃H₆NHC₄H₈N(CH₃)(CH₂OH) |
| 25 | (CF₃)₂CFO—(CF₂)₃COOCH₃ | NH(C₂H₅)C₂H₄N(C₂H₅)C₂H₄N(CH₃)₂ | (CF₃)₂CFO—(CF₂)₃CON(C₂H₅)C₂H₄N(C₂H₅)C₂H₄N(CH₃)₂ |
| 26 | (CF₃)₂CFO—(CF₂)₅COOH | NH₂C₃H₄N(C₆H₁₂OH)C₃H₄—⟨pyridyl⟩ | (CF₃)₂CFO—(CF₂)₅CONHC₃H₄N(C₆H₁₂OH)C₃H₄—⟨pyridyl⟩ |
| 27 | (CF₃)₂CFO—(CF₂)₇—(CH₂)₂—COOCH₃ | NH₂C₂H₄N(C₂H₅OH)C₂H₄—⟨2,4-diethylpyridyl⟩ | (CF₃)₂CFO—(CF₂)₇(CH₂)₂CONHC₂H₄N(C₂H₅OH)C₂H₄—⟨2,4-diethylpyridyl⟩ |
| 28 | (CF₃)₂CFO—(CF₂)₅COOH | NH₂C₄H₈NHC₄H₈—⟨2,4,5-trimethylpyridyl⟩ | O=C—(CF₂)₅—OCF(CF₃)₂ attached to trimethylpyridyl-C₄H₈NHC₄H₈— |
| 29 | Same as above | C₂H₄NH₂, NH₂C₂H₄NC₂H₄N⟨(CH₂)₆⟩ | C₂H₄NHCO—(CF₂)₇—OCF(CF₃)₂ with NH₂C₂H₄N⟨(CH₂)₆⟩ |
| 30 | Same as above | NH(CH₃)C₂H₄N(C₆H₁₂OH)(CH₃) | (CF₃)₂CFO—(CF₂)₇CON(CH₃)C₂H₄N(C₆H₁₂OH)(CH₃) |
| 31 | (CF₃)₂CFO—(CF₂)₅COOCH₃ | NH₂—CHCH₃CH₂CH₂N(C₂H₅)₂ | (CF₃)₂CFO—(CF₂)₅CONHCHCH₃CH₂CH₂N(C₂H₅)₂ |
| 32 | (CF₃)₂CFO—(CF₂)₅COOCH₃ | NH₂CH₂CH₂CH₂N⟨piperazinyl-N-CH₃⟩ | (CF₃)₂CFO—(CF₂)₅CONHCH₂CH₂CH₂N⟨piperazinyl-N-CH₃⟩ |
| 33 | Same as above | NH₂C₃H₄—N(C₃H₇)₂ | (CF₃)₂CFO—(CF₂)₅CONHC₃H₄N(C₃H₇)₂ |
| 34 | do | NH₂CH₂CH₂N(C₂H₅)₂ | (CF₃)₂CFO—(CF₂)₅CONHCH₂CH₂N(C₂H₅)₂ |
| 35 | do | NH₂—C₄H₈—⟨pyridyl⟩ | (CF₃)₂CFO—(CF₂)₅CONHC₄H₈—⟨pyridyl⟩ |
| 36 | do | NH(CH₃)C₂H₄—⟨pyridyl⟩ | (CF₃)₂CFO—(CF₂)₅CON(CH₃)C₂H₄—⟨pyridyl⟩ |
| 37 | (CF₃)₂CFO—CF₂CF₂CH₂CH₂COOCH₃ | NH₂(CH₂)₃N(CH₃)₂ | (CF₃)₂CFO—CF₂CF₂CH₂CH₂CONH(CH₂)₃N(CH₃)₂ |
| 38 | (CF₃)₂CFO—CF₂—COOH | NH₂C₂H₄NHC₂H₄N⟨piperazinyl-N-CH₃⟩ | (CF₃)₂CFO—CF₂—CONHC₂H₄NC₂H₄CONH(CH₂)₃N⟨N-methylpiperazinyl⟩ |

The result of a test relating to the evaluation of a typical fluorinated amide composition of the present invention as oil-repellency agent on textiles is shown below. The composition employed in that test consisted of a mixture of compounds of the formula $$(CF_3)_2CFO\text{---}(CF_2)_xCONH(CH_2)_3N(CH_3)_2$$

wherein $x=3, 5$ and $7$.

The procedure employed in determining the oil-repellency ratings is described, for example, on pages 323–4 of the April 1962 edition of the Textile Research Journal. This procedure involves gently placing on the treated fabric drops of mixtures of mineral oil ("Nujol") and n-heptane in varying proportions. The drops are allowed to stand on the treated fabric undisturbed for 3 minutes. After that 3 minute time period the wetting and penetration of the fabric is visually observed. The number corresponding to the mixture containing the highest percentage of heptane which does not penetrate or wet the fabric is considered to be the oil-repellency rating of the treated fabric.

The test was conducted on one inch square pieces of 80 x 80 count cotton print cloth. In preparing these samples for test the pieces of cotton print cloth were impregnated by total immersion for 5 minutes in an acetone solution containing 0.12 g. of the amide composition per 3 ml. of acetone. The test specimens were then air dried, and subjected to the oil-repellency test above described. The oil-repellency rating was 110, indicating excellent oil-repellency.

When other fluorinated amide compounds within the purview of the present invention are applied to textile materials, as described above, similar results are obtained, that is to say a high degree of oil-repellency is imparted to the materials so treated.

Since various changes and modifications may be made in the invention without departing from the spirit and essential characteristics thereof, it is intended that all matter contained in the above description shall be interpreted as illustrative only and not in a limiting sense.

We claim:

1. Compounds having the formula $$\overset{O}{\underset{\|}{R_f\text{---}C}}\text{---}\overset{Y}{\underset{|}{N}}\text{---}(R\text{---}\overset{Y'}{\underset{|}{N}})_q\text{---}RQ$$

wherein (a) $R_f$ is a radical having the formula $$\begin{array}{c}R_1\\|\\F\text{---}C\text{---}R_2\\|\\F\text{---}C\text{---}O\text{---}(CF_2)_r\text{---}(CF_2CF_2)_m\text{---}(CH_2CH_2)_n\text{---}(CX_2)_p\text{---}\\|\\F\text{---}C\text{---}R_2\\|\\R_1\end{array}$$

wherein (i) $R_1$ and $R_2$ are fluorine or are fluoroalkyl groups, which $R_1$ and $R_2$ groups may each have from 1 to 9 carbon atoms, provided that not more than three of the $R_1$ and $R_2$ groups may be fluoroalkyl groups, (ii) $m$ and $n$ are each integers of from 0 to 10, with the proviso that the sum of $m$ and $n$ is from 0 to 20, and provided further than when $r$ is 0, $m$ is at least 1, (iii) X is selected from the group consisting of hydrogen and fluorine, with the proviso that when $n$ is greater than 0, then X is always hydrogen, (iv) $p$ is 0 or 1

(v) $r$ is 0 or 1, with the proviso that when the sum of $m$, $n$ and $p$ is greater than 0, then $r$ is always 0, (b) Y is selected from the group consisting of hydrogen and alkyl having from 1 to 6 carbon atoms, (c) R, which may be the same or different, is a divalent straight-chain or branched-chain alkylene bridging group containing from 1 to 6 carbon atoms, (d) $q$ is an integer from 0 to 2, (e) Q is a radical having the formula $$-N\diagdown_{R^b}^{R^a}$$

wherein $R^a$ and $R^b$ are independently selected from the group consisting of alkyl having from 1 to 6 carbon atoms and a radical having the formula —ROH wherein R has the afore-stated meaning, (f) Y', which may be the same or different in different $$-(R\text{---}\overset{Y'}{\underset{|}{N}})-$$

groups is a member selected from the group consisting of (i) hydrogen,
(ii) alkyl having from 1 to 6 carbon atoms,
(iii) a radical having the formula —ROH wherein R has the afore-stated meaning,
(iv) an acyl radical having the formula $$\overset{O}{\underset{\|}{-C}}-R_f$$

wherein $R_f$ has the afore-stated meaning,
(vi) a radical having the formula —RNYZ wherein R and Y have the afore-stated meanings and Z is a member selected from the group consisting of hydrogen, alkyl having from 1 to 6 carbon atoms, and an acyl radical having the formula $$\overset{O}{\underset{\|}{-C}}-R_f$$

wherein $R_f$ has the afore-stated meaning.

2. Compounds according to claim 1 wherein $R_f$ has the formula $$(CF_3)_2CFO\text{---}(CF_2)_r\text{---}(CF_2CF_2)_m\text{---}(CH_2CH_2)_n\text{---}(CX_2)_p\text{---}$$

wherein X, r, m, n and p have the meanings given in claim 1.

3. Compounds according to claim 2 wherein $m$ and $n$ are each integers from 0 to 10, with the proviso that the sum of $m$ and $n$ is from 0 to 10.

4. Compounds according to claim 3 wherein the divalent alkylene bridging group R contains from 2 to 4 carbon atoms and wherein Y is hydrogen.

5. Compounds according to claim 4 wherein Q is a radical having the formula $$-N\diagdown_{R^b}^{R^a}$$

wherein $R^a$ and $R^b$ are independently selected from the group consisting of alkyl having from 1 to 6 carbon atoms and a radical having the formula —ROH wherein R is a divalent straight-chain or branched-chain alkylene bridging group containing from 1 to 6 carbon atoms.

6. Compounds according to claim 5 wherein $R^a$ and $R^b$ are alkyl radicals having from 1 to 3 carbon atoms.

7. Compounds according to claim 1 having the formula $$\overset{O}{\underset{\|}{R_f\text{---}C}}\text{---}NH\text{---}R\text{---}Q$$

wherein $R_f$, R and Q have the meanings given in claim 1.

8. Compounds according to claim 7 wherein $R_f$ has the formula $$(CF_3)_2CFO\text{---}(CF_2)_r\text{---}(CF_2CF_2)_m\text{---}(CH_2CH_2)_n\text{---}(CX_2)_p\text{---}$$

wherein X is selected from the group consisting of hydrogen and fluorine, provided that when $n$ is greater than 1, then X is always hydrogen, $p$ is 0 or 1, $r$ is 0 or 1, provided that when the sum of $m$, $n$ and $p$ is greater than 0, then $r$ is always 0, and wherein $m$ and $n$ are each integers from 0 to 10, with the proviso that the sum of $m$ and $n$ is from 0 to 10.

9. Compounds according to claim 8 wherein the divalent alkylene bridging group R contains from 2 to 4 carbon atoms and wherein Y is hydrogen.

10. Compounds according to claim 9 wherein Q is a radical having the formula

11. Compounds according to claim 10 wherein $R^a$ and $R^b$ are alkyl radicals having from 1 to 3 carbon atoms.

12. A compound according to claim 11 having the structural formula $(CF_3)_2CFO—CF_2—CONHCH_2CH_2CH_2N(CH_3)_2$ 13. A compound according to claim 11 having the structural formula $(CF_3)_2CFO—(CF_2)_3CONH(CH_2)_3N(CH_3)_2$ 14. A compound according to claim 11 having the structural formula $(CF_3)_2CFO—(CF_2)_5CONH(CH_2)_3N(CH_3)_2$ 15. A compound according to claim 11 having the structural formula $(CF_3)_2CFO—(CF_2)_7CONH(CH_2)_3N(CH_3)_2$ 16. A compound according to claim 11 having the structural formula $(CF_3)_2CFO—CF_2CF_2CH_2CH_2CONH(CH_2)_3N(CH_3)_2$ 17. A compound according to claim 11 having the structural formula $(CF_3)_2CFO—(CF_2)_3CONH(CH_2)_3N(C_2H_5)_2$ 18. A compound according to claim 11 having the structural formula $(CF_3)_2CFO—(CF_2)_5IONH(CH_2)_3N(C_2H_5)_2$

References Cited
UNITED STATES PATENTS 3,409,647  11/1968  Pittman et al. _____ 260—408
3,446,570  5/1969  Sweeney et al. _____ 8—116.2

LEWIS GOTTS, Primary Examiner

E. G. LOVE, Assistant Examiner

U.S. Cl. X.R.

252—8.8; 260—295, 239, 268, 557, 561, 294

PO-1050
(5/69)

UNITED STATES PATENT OFFICE
CERTIFICATE OF CORRECTION

Patent No. 3,600,415         Dated   August 17, 1971

Inventor(s)  Richard F. Sweeney and Alson K. Price

It is certified that error appears in the above-identified patent and that said Letters Patent are hereby corrected as shown below:

Column 3, line 22, "2-aminoethyl-6-methylpyridine" should read --2-aminomethyl-6-methylpyridine--.

Column 4, line 34, "Florinated" should read -- Fluorinated --.

Column 5, line 8, "fluorinted" should read --fluorinated--.

Column 6, the third line of the 2nd formula should read --F-C-O-$CF_2CF_2$- --.

Column 6, line 65, that part of the formula reading "$(CH_2)CH_2)_o$" should read --$(CH_2)(CH_2)$--.

Column 8, line 8, "methylundeconoate)" should read --methylundecanoate--.

Table I, Example 12, under Amine reactant, that part of the formula reading "$C_3H_6NCH_3)_2$" should read --$C_3H_6N(CH_3)_2$--

Table I, Example 12, under Product, that part of the formula reading "$C_3H_6N(CH)_2$" should read --$C_3H_6N(CH_3)_2$--.

Table I, Example 18, under Amine reactant, that part of the formula reading "$NH(CH_3) C_2H_4NH)$ " should read --$NH(CH_3)(C_2H_4NH)$ --

Table I, Example 17, under Product, that part of the formula reading "$]_2C_4H_8N(CH_3):$" should read --$]_2C_4H_8N(CH_3)_2$--.

PO-1050
(5/69)

UNITED STATES PATENT OFFICE
CERTIFICATE OF CORRECTION

Patent No. 3,600,415          Dated August 17, 1971

Inventor(s) Richard F. Sweeney and Alson K. Price    Page - 2

It is certified that error appears in the above-identified patent and that said Letters Patent are hereby corrected as shown below:

Example 20, Table I, that part of the Product reading "$C_2H_4M$" should read --$C_2H_4N$--.

Table I, Example 36, under Product, that part of the formula reading should read    " 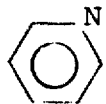 "

-- 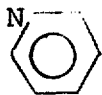 --

Column 14, line 29, "(vi)" should be --(v)--.

UNITED STATES PATENT OFFICE
CERTIFICATE OF CORRECTION

Patent No. 3,600,415          Dated August 17, 1971

Inventor(s) Richard F. Sweeney and Alson K. Price

It is certified that error appears in the above-identified patent and that said Letters Patent are hereby corrected as shown below:

Column 16, line 16, that part of the formula reading "$(CF_2)_5IONH$" should read -- $(CF_2)_5CONH$ --.

Signed and sealed this 18th day of July 1972.

(SEAL)
Attest:

EDWARD M. FLETCHER, JR.          ROBERT GOTTSCHALK
Attesting Officer          Commissioner of Patents